UNITED STATES PATENT OFFICE.

CLARENCE A. NASH, OF MILWAUKEE, WISCONSIN.

MANUFACTURE OF PHENOLIC CONDENSATION PRODUCTS.

1,343,575.     Specification of Letters Patent.     Patented June 15, 1920.

No Drawing.     Application filed March 10, 1919. Serial No. 281,642.

*To all whom it may concern:*

Be it known that I, CLARENCE A. NASH, a citizen of the United States, residing at Milwaukee, in the county of Milwaukee and State of Wisconsin, have invented a new and useful Improvement in Manufacture of Phenolic Condensation Products, of which the following is a specification.

The present invention is in the nature of an improvement upon the method of manufacturing phenolic condensation products described and claimed in the application of L. V. Redman, A. J. Weith, and Frank P. Brock, filed of even date herewith.

As is known, a phenolic condensation product is produced by combining a phenolic body, such as phenol or its homologues, with an active methylene substance, such as hexamethylenetetramin or formaldehyde, containing the methylene radical.

It is well known that a phenolic condensation product (usually having a filler introduced therein) may be molded in hot presses and discharged hot or cold, as desired. It has been proposed, also, to mix a phenolic condensation product with a filler and mold the same in the regular manner of cold-molded products, the final hardening being effected by subjecting the molded article to the action of heat after its removal from the mold. Thus, in patent to Hemming No. 1,125,906, granted January 19, 1915, it is proposed to prepare an initial product of phenol and formaldehyde (the latter in decided excess); arrest the reaction when a soluble resin of sp. gr. of from 1.15 to 1.21 has been produced; mix this binder with a filler; and then mold the mixture and harden by heat treatment. This calls for a reaction in the molded product in which water is formed as a by-product and must be eliminated by heat, tending to the production of a spongy and otherwise inferior product. Moreover, difficulty has been experienced in securing resins of proper consistency to permit the mass to be properly kneaded and afterward properly molded by a cold-molding process. This is due partly to the volatile nature of formaldehyde, and the difficulty of determining the loss of methylene. It has been proposed, also, to use such solvents as alcohol, acetone, etc., in an effort to secure the proper consistency and the proper coherency in the molding operation, but this involves additional expense for materials not useful in the product and is otherwise objectionable, and especially so because of the difficulty of securing the resin in a stage of reaction at which it is best adapted for the purpose. Again, in the Hemming process, the initial resin employed as a binder corresponds with the union of a major part of the formaldehyde with the phenolic body, so that even a resin of the lowest specific gravity mentioned by him, viz. 1.15, corresponds with a reaction so far advanced that the resin will not properly impregnate the filler; and after the mixing action has occurred, the particles or pellets of the molding compound will not be properly welded together by a cold molding operation. Notwithstanding, therefore, the great desirability of a quick-molding process adapted to the production of molded phenolic condensation product articles, no published or patented process has met the demand, and a quick-molding process for this class of product has not come into general use. The present invention is being successfully practised, and will meet a long-felt want.

The primary object of the present invention is to provide an improved practicable method whereby molded phenolic condensation product articles may be produced by a quick-molding operation at ordinary or moderate temperatures, followed by heat treatment after removal from the mold, to convert the molded article to a hard and substantially infusible state. By such a method, the output of the molds may be increased many fold. As an improvement upon the process described in the above-mentioned application, the present process possesses the advantage that it may be practised with greater facility, that it will result in an article of more uniform tensile strength and of maximum dielectric constant, and that it will result in an article possessing the maximum resistance to water absorption.

In the practice of the present invention, it is entirely feasible for a manufacturer of phenolic condensation products to supply to manufacturers of molded products a phenolic condensation product suitable for use in producing a molding compound adapted to a quick-molding process, followed by heat treatment to convert the molded article to a hard, resistant and practically infusible state. Also, the improved process is of a nature rendering it comparatively easy for a manufacturer of molded products to produce a phenolic condensation product molding compound without the aid or employment of chemists who are especially skilled in the production of phenolic condensation products. Also, the improved process may be practised with the greatest certainty of uniformity in results, without the exercise of any extraordinary care, as, for instance, in determining the stage at which the reaction is to be stopped in order to obtain an initial fusible condensation product which is well adapted for use in the subsequent steps of producing a molding compound adapted to the practice of the quick-molding process.

The preferred method of practising the improved process herein described is as follows:

First produce a substantially anhydrous fusible phenolic condensation product in which substantially all of the methylene employed in making such product is combined with the phenolic body employed, such fusible product corresponding with the union of about $2\frac{1}{2}$ phenolic groups to one methylene group; add to the initial fusible product a sufficient quantity of a non-volatile methylene substance which is capable of combining anhydrously with the fusible condensation product to convert the product to a hard and substantially infusible state; add to a given weight of asbestos in a mixer about 2% by weight of a slowly-volatile hydrocarbon solvent for the binder, such as creosote oil, or an oil obtained from the distillation of coal tar, or asphalt; thoroughly knead or mix the asbestos with the hydrocarbon solvent, which may require a period of from ten minutes to thirty minutes; then pour into the asbestos thus impregnated with the hydrocarbon solvent about $\frac{1}{3}$ by weight of the potentially reactive binder prepared as indicated above, the binder being in molten condition and at a temperature of about 100° F. to 140° F.; and mix the mass thoroughly, which may require about one-half hour. In the mixing operation, the materials will form into balls and pellets, being in a more or less disintegrated condition. The materials are then preferably dried by passing warm air over the same, and during this operation, which may require from one to several days, the material undergoes a change which is partly physical and partly chemical. The material then is preferably broken up in a disintegrator, until it is from 8 to 20 mesh, or finer. In this condition, the material is suitable for a quick-molding operation, followed by heat treatment to convert the molded article, after removal from the mold, to a hard and substantially infusible state. The molding operation may be performed in a few seconds under a suitable pressure, as, for instance, from 5,000 pounds to 15,000 pounds per square inch. The molded article is sufficiently firm to withstand removal from the mold and subjection to the subsequent heat treatment. After removal from the molds, the molded articles are preferably cured in an oven at a temperature ranging from 100° F. to 450° F., the temperature being preferably raised from time to time as the curing operation proceeds. The heat treatment may vary, however, greatly, depending upon the nature of the molded article but in any event should be continued until the molded article is converted to a hard, resistant and substantially infusible state. Where the filler employed is an inorganic filler, such as asbestos, the final temperature may range as high as 450° F. Where an organic filler, such as wood flour, is employed, the highest temperature employed should not reach the point at which charring would occur. Where the molded article is of uniform thickness, it is practicable to introduce the molded article into an oven heated to 350° F. at the outset, and a cure may be effected in from fifteen minutes to three hours, depending upon the size and thickness of the article. Where the article has metal inserts, or has recesses in it with walls of varying thickness, the heat treatment must be more cautiously performed, and will require a greater length of time.

By mixing the filler in the first instance with a small quantity of a non-volatile solvent of the nature indicated above, the filler can, with the greatest facility, be thoroughly and uniformly impregnated by the solvent, so that all of the fibers are moistened; and this has the effect of facilitating the mixture of the filler and the phenolic binder, with the result that all of the fibers of the filler are finally impregnated by the phenolic binder. Thus, an intimate mixture of the filler and the binder is obtained; and so, when the molding operation is performed, a thorough welding of the granulated particles of the molding compound occurs, so that a truly integral mass results. Thus, there is produced by the quick-molding process an article of high tensile strength, high dielectric constant, and low water absorptive quality.

The use of a slowly-volatile solvent having a relatively high boiling point is desirable, both because of the increased spreading, diffusing, or impregnating quality which it gives to the binder, and also because the use of such solvent serves to keep the materials in proper condition for molding for a comparatively long period of time; and in the heat treatment, after the molding operation, the solvent having a high boiling point acts as a tempering agent, and will not be readily driven off, whereas more usual solvents, such as alcohol, acetone, or a mixture of the usual solvents, would be rapidly driven off during the heat treatment, thereby tending to greater porosity and blistering or deformation of the molded article. The solvent may be a light coal tar oil, or a higher boiling point fraction known as "shingle stain" oil. Any suitable oil derived from the distillation of coal tar or asphalt, with a boiling point which may range from about 135° C. or lower, to about 270° C. may be employed. Such an oil usually comprises a mixture of cyclic hydrocarbon which cannot be designated by definite formula.

The heat treatment of the molded articles may be performed advantageously in a closed oven, kiln, or vulcanizer. Usually it is desirable to make provision for the escape and collection of the ammonia which is given off during the baking operation. The ammonia may be collected and used again, for instance, in making a fresh supply of hexamethylenetetramin.

Any suitable filler, such as asbestos, mica, flock, wood pulp, etc., may be employed. It is desirable to use, ordinarily, a high proportion of filler. In the case of asbestos, an excellent product is obtained by using 60% to 80% by weight of asbestos and 20% to 40% by weight of binder. The proportions may vary greatly, however. It is desirable, both for economy and facility in producing a molding compound adapted to the quick-molding process, to employ a high percentage of filler. In the case of wood flour, the filler and binder may be advantageously of about equal weights. Proportions of the fusible condensation product and the methylene body employed may vary somewhat, but it is desirable to have approximately one methylene group to each phenolic group in the final product.

The use of a solvent of the character referred to above imparts to the molding compound a quality which prevents injury to the dies in the molding operation, so that the sharp edges or corners of the dies will not wear off, and it is thus possible to preserve sharp outlines in the molded product for a very large number of operations. This is a very important consideration, and the result is doubtless due to the fact that the great body of molding compound retains the solvent, even after there has been an apparent surface evaporation from the particles, or pellets, which make up the compound, so that the compound retains perfect plasticity and will not cut the dies, even though the molding operation be not performed until a considerable time after the compound has been prepared.

As stated, the fusible substantially anhydrous phenolic condensation product which it is preferred to employ as the main part of the binder preferably contains about $2\frac{1}{2}$ phenolic groups to each methylene group. This may vary, however, from a lower limit of about two phenolic groups to each methylene group to an upper limit of about three and one-half phenolic groups to each methylene group. It is not desirable in practice, however, to employ less than $2\frac{1}{6}$ phenolic groups to each methylene group, or to employ more than 3 phenolic groups to each methylene group. Where the methylene body employed in preparing the fusible phenolic condensation product is hexamethylenetetramin, the ration of $2\frac{1}{3}$ phenolic groups to one methylene group corresponds with about one mol of hexamethylenetetramin to fourteen mols of cresol.

The fusible substantially anhydrous binder which it is preferred to employ in the practice of the process is produced preferably by either of the two methods which follow, viz.:

(a) Mix 1080 pounds of cresol ($2CH_3C_6H_4OH$) and 140 pounds of hexamethylenetetramin ($(CH_2)_6N_4$); heat the mixture in a vessel or still, while stirring, to a temperature of 140° C.; then turn off the heat and allow the evolution of ammonia to proceed (the temperature automatically rising); apply further heat after the rapid evolution of ammonia ceases, continuing the heat at a temperature of preferably 165° C. for twelve to twenty-four hours; then raise the temperature gradually through a period of from four to seven hours, reaching a temperature of about 215° C. and discontinue the heat after the methylene substance has all combined; take 576 pounds of cresol and add to it the molten resin just described. This provides a fusible phenolic condensation product containing about one mol of hexa. to 15 mols of cresol, or $2\frac{1}{2}$ phenolic groups to each methylene group.

(b) Mix 1080 pounds of cresol ($2CH_3C_6H_4OH$) and 93 pounds of hexamethylenetetramin ($(CH_2)_6N_4$); heat the mixture in a vessel or still, while stirring, to a temperature of 140° C.; then turn off the heat and allow the evolution of ammonia to proceed (the temperature automatically rising); apply further heat after the rapid evolution of ammonia ceases; continuing the heat at a temperature of preferably 165° C. for twelve to twenty-four hours; then raise the temperature gradually through a period of from four to seven hours, reaching a temperature of about 215° C. and discontinue the heat after the methylene substance has all combined. This gives a fusible anhydrous phenolic condensation product containing about one mol of hexamethylenetetramin to 14 mols of cresol, or about $2\frac{1}{3}$ phenolic groups to each methylene group.

A less desirable method of producing a fusible, substantially anhydrous phenolic condensation product adapted for use in the practice of the process is as follows:

Boil together a 40% solution of formaldehyde and cresol, taken in such proportions as to afford about 2½ phenolic groups to each methylene group, continuing the reaction until the formaldehyde is practically all combined with the phenol; eliminate the water, as by drawing off the supernatant liquid and concentrating the resinous mass. This gives a fusible, substantially anhydrous resin, containing about 2½ phenolic groups to each methylene group. If the boiling operation is performed under conditions which will result in the loss of some of the formaldehyde, it is desirable to employ, in the first instance, somewhat more formaldehyde than corresponds with 2½ phenolic groups to each methylene group.

Having obtained by one of these methods, or a desired method, a fusible, substantially anhydrous phenolic condensation product containing more than two phenolic groups to each methylene group, a molding compound adapted to a quick-molding operation and subsequent heat treatment after removal from the mold for hardening purposes may be produced by mixing with the fusible, substantially anhydrous resin a sufficient quantity of fibrous filler to give the desired consistence, and a sufficient quantity of a non-volatile methylene substance which will unite anhydrously with the fusible resin to produce a hard and substantially infusible phenolic condensation product. For illustration, one may take the fusible resin in melted condition, preferably at a temperature of about 150° F., and add thereto enough hexamethylenetetramin to make the binder, as a whole, contain about one methylene group to each phenolic group, thus providing a potentially reactive binder, and this binder may be mixed with from two to three times its weight of asbestos, previously thoroughly mixed with a hydrocarbon solvent of high boiling-point. After the mixing operation, the molding compound may be subjected to a drying operation, and then mechanically disintegrated to produce a granulated molding product adapted to the quick-molding process.

If desired, the granulated molding compound may be rolled into sheets, which may be placed upon a steam-table and preparatorily warmed, and then balled up and introduced, in a warm condition, into the dies; or, the granulated molding compound may be warmed and introduced in this form into the dies and subjected to a quick-molding operation. Such preparatory heating of the materials tends to the production of a finer grained molded article, and to some extent may reduce the time of the curing operation after removal from the molds. The dies need not be provided with means for heating them, but may be employed at ordinary room temperatures, or at the temperature which they acquire from operating upon the molding compound as preliminarily heated. It is advantageous, for instance, to subject the molding compound for a couple moments to a temperature of about 250° F., before introducing the compound into the mold.

It will be noted that the fusible anhydrous resin is produced, in the first instance, by completely combining the methylene substance, which is originally used with the phenol, by boiling the materials together. Thus, by properly weighing the materials in the first instance, the boiling operation may be performed without danger of obtaining a condensation product in which the reaction has progressed beyond the stage where it is suitable for use in producing a cold molding compound. The fusible anhydrous phenolic condensation product may be shipped, in this condition, to manufacturers of molded products; and such manufacturers may readily perform the operation of mixing the fusible anhydrous phenolic condensation product with a sufficient quantity of hexamethylenetetramin to effect conversion to the final infusible state and the requisite amount of fibrous filler to give the desired consistency to the molding mixture and desired qualities to the molded product.

By using a fusible, substantially anhydrous phenolic resin and a methylene substance which will combine therewith in an anhydrous reaction, after the quick-molding operation has been performed, the curing operation may be readily performed without injury to the molded article, and a molded article will be produced which possesses high tensile strength, a high dielectric constant, and a body which has slight capability, if any, of water absorption. Any suitable phenolic body may be employed in producing the binder, such as phenol, or a homologue, cresols, or a mixture of cresols. Among the recognized equivalent phenolic bodies in the art may be mentioned phenol, the cresols, and the xylenols. The most desirable active methylene body for use in the process is the methylene-amin compound hexamethylenetetramin. Another instance of a non-volatile methylene-amin compound which is capable of being used in connection with the fusible anhydrous resin combining therewith by an anhydrous reaction is hydrobenzamid. It may be stated, however, that this latter substance is too expensive at the present time to be economically employed in the process.

The foregoing detailed description has been given for clearness of understanding only, and no unnecessary limitation should be understood therefrom, but the appended claims should be construed as broadly as permissible, in view of the prior art.

What I regard as new, and desire to secure by Letters Patent, is:

1. The process of producing a molded phenolic condensation product article, which comprises: initially mixing together a fibrous filler and a relatively small quantity of a slowly-volatile solvent for a fusible phenolic condensation product; mixing together the filler thus impregnated and a binder comprising a substantially anhydrous phenolic condensation product corresponding with the reaction between a phenolic body and a methylene body in proportions affording at least two phenolic groups to each methylene group and a non-volatile methylene body in sufficient quantity to give to the molding mixture approximately one phenolic group to each methylene group; subjecting the molding compound to a quick-molding operation to form a body; and subjecting the molded article, after removal from the mold, to prolonged heat treatment until a hard and substantially infusible body results.

2. The process of producing a molded phenolic condensation product article, which comprises: mixing together a fibrous filler and a slowly-volatile hydrocarbon solvent for a fusible phenolic condensation product; mixing with the filler thus impregnated a binder comprising a substantially anhydrous phenolic condensation product corresponding with the reaction between a phenolic body and a methylene body in proportions affording at least two phenolic groups to each methylene group and hexamethylenetetramin in sufficient quantity to give to the molding mixture approximately one methylene group to each phenolic group; subjecting the molding compound to a quick molding operation to form a body; and subjecting the molded article, after removal from the mold, to prolonged heat treatment until a hard and substantially infusible body results.

3. The process of producing a molded phenolic condensation product article, which comprises: mixing together a fibrous filler and a relatively small quantity of a hydrocarbon solvent of high boiling-point; mixing the filler thus impregnated and a binder comprising a substantially anhydrous phenolic condensation product in which substantially all of the methylene substance employed in making such product has combined with the phenolic body, such condensation product corresponding with the reaction between a phenolic body and a methylene body in proportions affording at least two phenolic groups to each methylene group, and hexamethylenetetramin in sufficient quantity to give to the molding mixture approximately one methylene group to each phenolic group; drying and disintegrating the molding compound; subjecting the molding compound to a quick-molding operation to form a body; and subjecting the molded article, after removal from the mold, to prolonged heat treatment until a hard and substantially infusible body results.

4. The process of producing a molded phenolic condensation product article, which comprises: thoroughly impregnating a fibrous filler with a relatively small quantity of hydrocarbon solvent of high boiling-point; mixing together such impregnated filler and a binder comprising a fusible phenolic condensation product corresponding with the reaction between a phenolic body and a methylene body in proportions affording at least two phenolic groups to each methylene group and a non-volatile methylene body adapted to react anhydrously therewith, taken in sufficient quantity to give to the molding mixture approximately one methylene group to each phenolic group; drying and mechanically treating the mixture to put it in suitable form for use as a molding compound; preparatorily heating the molding compound; subjecting the preparatorily heated molding compound to a quick-molding operation to form a body; and subjecting the molded article, after removal from the mold, to prolonged heat treatment until a hard and substantially infusible body results.

5. The process of producing a molding compound adapted for producing molded articles by a quick-molding operation followed by heat treatment, after removal of the article from the mold, which comprises: mixing a fibrous filler and a relatively small quantity of a slowly-volatile solvent for a phenolic binder; and mixing the filler thus impregnated and a binder comprising unreacted hexamethylenetetramin and a fusible phenolic condensation product, the binder containing more than two phenolic groups to each methylene group in said condensation product.

6. The process of producing a molding compound adapted for producing molded articles by a quick-molding operation followed by heat treatment, after removal of the article from the mold, which comprises: mixing a fibrous filler and a relatively small quantity of a slowly-volatile solvent for a phenolic binder; mixing the filler thus impregnated and a binder comprising unreacted hexamethylenetetramin and a fusible phenolic condensation product in which substantially all of the methylene substance employed in making such condensation product is combined with the phenolic body employed, the binder containing more than two phenolic groups to each methylene group in said condensation product, and drying and disintegrating the mixture.

7. The process of producing a molding compound adapted for producing molded articles by a quick-molding operation followed by heat treatment, after removal of the article from the mold, which comprises: preparing a substantially anhydrous fusible phenolic condensation product containing more than two phenolic groups to each methylene group, the methylene substance employed in making such condensation product being substantially all combined with the phenolic body employed; impregnating a fibrous filler with a hydrocarbon solvent having a high boiling-point; mixing with the filler thus impregnated the fusible phenolic condensation product and a sufficient quantity of hexamethylenetetramin to effect conversion of the binder to a hard and substantially infusible state; and subjecting the compound to a drying and mechanical operation to place the same in desired condition for molding.

8. The process of producing a phenolic condensation product, which comprises: impregnating a fibrous material with a light coal tar oil; mixing the impregnated material with a binder comprising unreacted hexamethylenetetramin and a substantially anhydrous fusible phenolic condensation product in which substantially all of the methylene substance employed in making such phenolic condensation product is combined with the phenolic body employed, the binder containing more than two phenolic groups to each methylene group of the phenolic condensation product and the hexamethylenetetramin being taken in sufficient quantity to effect conversion to a hard and substantially infusible state; and subjecting said fibrous mixture to a forming operation and heat treatment substantially as described, until a hard, resistant and substantially infusible body results.

CLARENCE A. NASH.